United States Patent
Cheng et al.

(10) Patent No.: US 7,952,657 B2
(45) Date of Patent: May 31, 2011

(54) LIQUID CRYSTAL DISPLAY HAVING HIGH COLOR SATURATION

(75) Inventors: Sheng-Wen Cheng, Hsinchu (TW);
Chun-Chieh Wang, Hsinchu (TW);
Chen-Hsien Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1050 days.

(21) Appl. No.: 11/681,795

(22) Filed: Mar. 5, 2007

(65) Prior Publication Data
US 2008/0143932 A1 Jun. 19, 2008

(30) Foreign Application Priority Data

Dec. 15, 2006 (TW) .............................. 95147034 A

(51) Int. Cl.
*G02F 1/1335* (2006.01)
(52) U.S. Cl. .......................................... 349/61; 349/106
(58) Field of Classification Search .................. 349/61, 349/106
See application file for complete search history.

(56) References Cited

U.S. PATENT DOCUMENTS

| | | | |
|---|---|---|---|
| 7,006,172 B2 | 2/2006 | Kawana et al. | |
| 2005/0253795 A1 | 11/2005 | Moriya et al. | |
| 2005/0264721 A1* | 12/2005 | Lee et al. | 349/106 |
| 2006/0183038 A1* | 8/2006 | Takizawa | 430/7 |
| 2006/0274235 A1* | 12/2006 | Takizawa | 349/108 |
| 2009/0284687 A1* | 11/2009 | Kirita et al. | 349/65 |

FOREIGN PATENT DOCUMENTS

| | | |
|---|---|---|
| JP | 2005-014599 | 1/2005 |
| JP | 2005-134508 | 5/2005 |
| TW | 594828 | 6/2004 |
| TW | 200537431 | 11/2005 |
| TW | 200615664 | 5/2006 |
| TW | 200635087 | 10/2006 |

OTHER PUBLICATIONS

"Office Action of Taiwan Counterpart Application", issued on Dec. 29, 2011, p1-p8, in which the listed references were cited.

* cited by examiner

*Primary Examiner* — Nathanael R Briggs
(74) *Attorney, Agent, or Firm* — Jianq Chyun IP Office

(57) ABSTRACT

A liquid crystal display comprising a backlight module and a liquid crystal display panel is provided. The backlight module comprises a white point source that emits a spectrum of light comprising three peaks. The liquid crystal display panel comprises a liquid crystal layer disposed between a color filter substrate, which comprises a blue filter, a green filter and a red filter, and an opposite substrate. The color filter substrate and the backlight module satisfy the following formulas:

$$\sum_{555}^{605} BL(\lambda) \times CF_{Red}(\lambda) \times \Delta\lambda \leq 6.0; \quad (1)$$

$$\sum_{580}^{630} BL(\lambda) \times CF_{Green}(\lambda) \times \Delta\lambda \leq 3.5; \quad (2)$$

$$\sum_{505}^{580} BL(\lambda) \times CF_{Blue}(\lambda) \times \Delta\lambda \leq 3.5. \quad (3)$$

Herein, the backlight module has the maximum luminance in one wavelength, with the maximum luminance being set at 1.0. $BL(\lambda)$ represents the normalized luminance spectrum at each wavelength. $CF_{Blue}(\lambda)$, $CF_{Green}(\lambda)$ and $CF_{Red}(\lambda)$ represent the transmittance of light at each wavelength passing through the blue filter, the green filter, and the red filter respectively. $\Delta\lambda$ is the wavelength interval.

20 Claims, 8 Drawing Sheets

LIQUID CRYSTAL DISPLAY HAVING HIGH COLOR SATURATION

CROSS-REFERENCE TO RELATED APPLICATION

This application claims the priority benefit of Taiwan application serial no. 95147034, filed on Dec. 15, 2006. All disclosure of the Taiwan application is incorporated herein by reference.

BACKGROUND OF THE INVENTION

1. Field of the Invention

The present invention relates to a display device. More particularly, the present invention relates to a liquid crystal display having high color saturation.

2. Description of Related Art

Thin film transistor liquid crystal displays (TFT-LCD) have become a mainstream product in the display market due to high image quality, great space efficiency, low power consumption and no radiation. To achieve high-fidelity color reproduction, cold-cathode fluorescent lamps (CCFL) are used as backlighting for computer and TV monitors. According to the NTSC (National Television System Committee) color television standard, liquid crystal displays using CCFL can achieve an NTSC ratio of 72% and above. However, the color saturation of liquid crystal displays utilized in handheld or portable devices such as cell phones is still unsatisfactory. Conceivably, to satisfy users' ever-increasing needs, all manufacturers focus on developing high-fidelity color reproduction techniques. Further, the development of high-fidelity color reproduction techniques is primarily related to the backlight module of liquid crystal display and the color filter substrate.

In the development of high-fidelity color reproduction techniques, the type of backlight modules used is critical. At present, white light emitting diodes (LED) are used the most commonly as backlighting. It is because white LEDs are compact, non-toxic, driven by direct current and simple in construct. Moreover, white LEDs have fast response time and long lifetime. As a result, white LEDs have been widely used in backlight modules for portable devices. Currently, in most white LED backlight modules, the white LED includes a blue LED chip and yttrium aluminum garnet (YAG) phosphor. However, the color rendering property of this type of white LED is poor. More specifically, as the NTSC ratio of a liquid crystal display increases, the luminance of the liquid crystal display decreases drastically. Hence, another type of white LED has been developed, which utilizes red, green and blue LED chips for emitting light (e.g. red, green, and blue light) of different wavelengths. This type of white LED can easily increase the NTSC ratio of a liquid crystal display. On the other hand, the white LED utilizing red, green and blue LED chips simultaneously is bulky and high-cost. Additionally, the control circuitry for driving the red, green and blue LED chips is complex. Consequently, conventional liquid crystal displays cannot achieve high color saturation due to the limited volume of the existing backlight module and the simplicity of the existing control circuitry.

SUMMARY OF THE INVENTION

Accordingly, the present invention provides a liquid crystal display having high color saturation.

The present invention provides a liquid crystal display comprising a backlight module and a liquid crystal display panel. The backlight module comprises at least one white point source, which emits a spectrum of light having at least three peaks. The liquid crystal display panel is disposed over the backlight module and the liquid crystal display panel comprises a color filter substrate, an opposite substrate and a liquid crystal layer, wherein the liquid crystal layer is disposed between the color filter substrate and the opposite substrate, and the color filter substrate comprises a blue filter, a green filter and a red filter. Further, the color filter substrate and the backlight module satisfy the following formulas:

$$\sum_{555}^{605} BL(\lambda) \times CF_{Red}(\lambda) \times \Delta\lambda \leq 6.0; \qquad (1)$$

$$\sum_{580}^{630} BL(\lambda) \times CF_{Green}(\lambda) \times \Delta\lambda \leq 3.5; \qquad (2)$$

$$\sum_{505}^{580} BL(\lambda) \times CF_{Blue}(\lambda) \times \Delta\lambda \leq 3.5. \qquad (3)$$

Herein, the backlight module has the maximum luminance in one wavelength, with the maximum luminance being set at 1.0. Further, $BL(\lambda)$ represents the normalized luminance spectrum at each wavelength. $CF_{Blue}(\lambda)$ represents the transmittance of light at each wavelength passing through the blue filter. $CF_{Green}(\lambda)$ represents the transmittance of light at each wavelength passing through the green filter. $CF_{Red}(\lambda)$ represents the transmittance of light at each wavelength passing through the red filter. $\Delta\lambda$ represents the wavelength interval.

In one embodiment of the present invention, wherein the color filter substrate and the backlight module further satisfy the following formulas:

$$\sum_{605}^{680} BL(\lambda) \times CF_{Red}(\lambda) \times \Delta\lambda \geq 11.0; \qquad (4)$$

$$\sum_{500}^{560} BL(\lambda) \times CF_{Green}(\lambda) \times \Delta\lambda \geq 12.6 \qquad (5)$$

In one embodiment of the present invention, wherein the red filter and the backlight module further satisfy the following formula:

$$1.72 \leq \sum_{555}^{605} BL(\lambda) \times CF_{Red}(\lambda) \times \Delta\lambda \leq 3.84 \qquad (6)$$

In one embodiment of the present invention, wherein the green filter and the backlight module further satisfy the following formula:

$$1.79 \leq \sum_{580}^{630} BL(\lambda) \times CF_{Green}(\lambda) \times \Delta\lambda \leq 3.31 \qquad (7)$$

In one embodiment of the present invention, wherein the blue filter and the backlight module further satisfy the following formula:

$$0.65 \leq \sum_{505}^{580} BL(\lambda) \times CF_{Blue}(\lambda) \times \Delta\lambda \leq 2.39 \qquad (8)$$

In one embodiment of the present invention, the parameter for Δλ is 1.

In one embodiment of the present invention, the opposite substrate is a thin film transistor array substrate.

In one embodiment of the present invention, the color filter substrate is a color filter on array (COA) substrate and the opposite substrate is a substrate having a common electrode.

In one embodiment of the present invention, the color filter substrate is an array on color filter (AOC) substrate and the opposite substrate is a substrate having a common electrode.

In one embodiment of the present invention, each white point source comprises a blue light emitting element, yttrium aluminum garnet (YAG) phosphor and a red light emitting element.

In one embodiment of the present invention, each white point source comprises a blue light emitting element, yttrium aluminum garnet (YAG) phosphor and a red light phosphor.

In one embodiment of the present invention, the blue light emitting element and the red light emitting element comprise light emitting diode chips or organic light emitting diode chips.

Within a specific range of wavelength, the present invention defines the relation between the spectrums of light source and the transmittance of the color filter. Hence, the present invention can achieves a high NTSC ratio and high transmittance through determining the color filter and the spectrum of the light source of the backlight module.

In order to make the aforementioned and other features and advantages of the present invention more comprehensible, preferred embodiments accompanied with figures are described in detail below.

DESCRIPTION OF EMBODIMENTS

Figure 1:
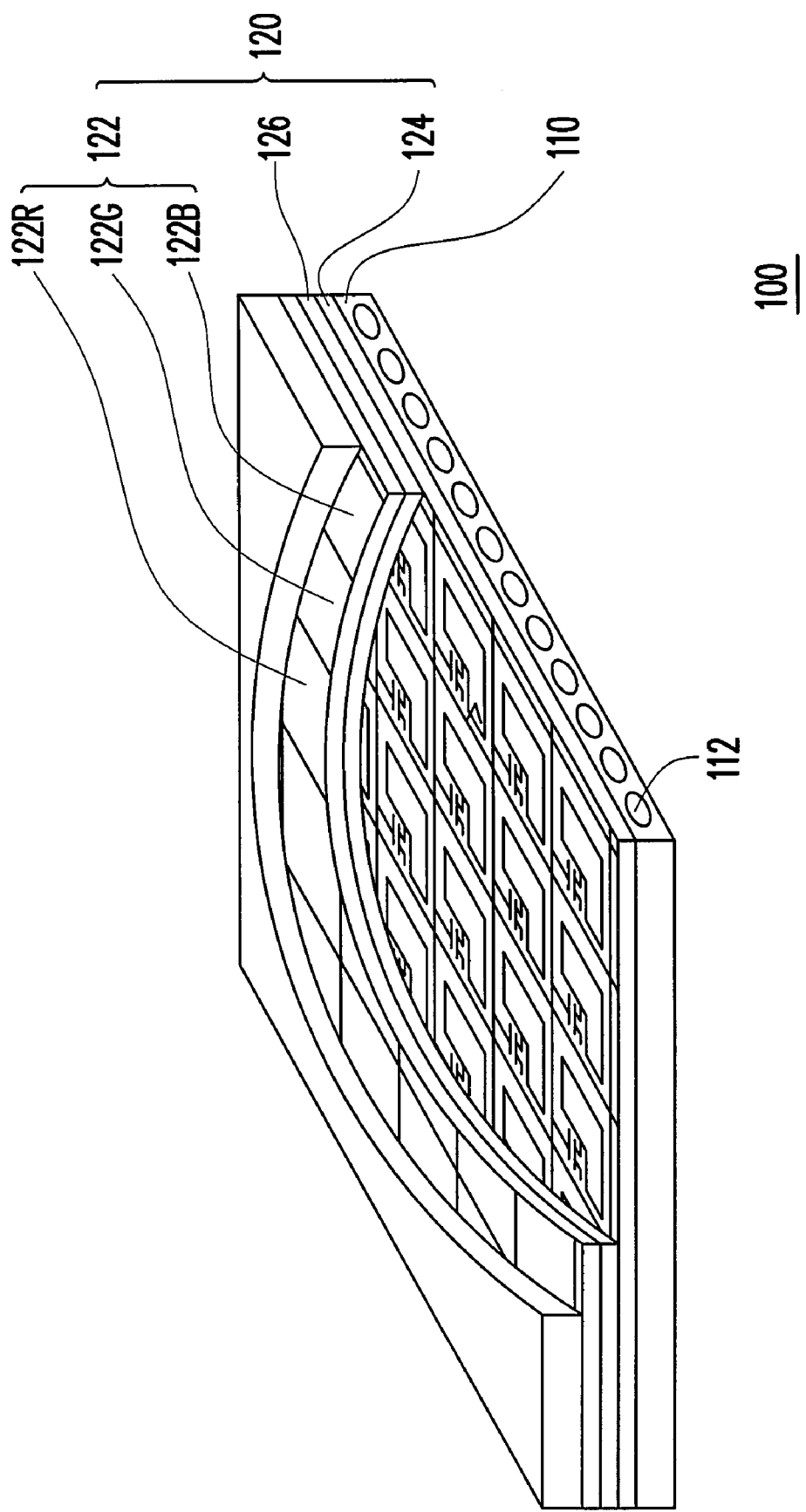
FIG. 1 is a schematic view illustrating a liquid crystal display according to one embodiment of the present invention.

FIG. 1 is a schematic view illustrating a liquid crystal display according to one embodiment of the present invention. In the present embodiment, a liquid crystal display 100 comprises a backlight module 110 and a liquid crystal display panel 120. The backlight module 110 comprises at least one white point source 112, which emits a spectrum of light having at least three peaks. The liquid crystal display panel 120 is disposed over the backlight module 110 and the liquid crystal display panel 120 comprises a color filter substrate 122, an opposite substrate 124 and a liquid crystal layer 126, wherein the liquid crystal layer 126 is disposed between the color filter substrate 122 and the opposite substrate 124, and the color filter substrate 122 comprises a blue filter 122B, a green filter 122G and a red filter 122R. Further, the color filter substrate 122 and the backlight module 110 satisfy the following formulas:

$$\sum_{555}^{605} BL(\lambda) \times CF_{Red}(\lambda) \times \Delta\lambda \leq 6.0; \qquad (1)$$

$$\sum_{580}^{630} BL(\lambda) \times CF_{Green}(\lambda) \times \Delta\lambda \leq 3.5; \qquad (2)$$

$$\sum_{505}^{580} BL(\lambda) \times CF_{Blue}(\lambda) \times \Delta\lambda \leq 3.5. \qquad (3)$$

Herein, one wavelength emitted by the backlight module has the maximum luminance, which is set to 1.0. Further, BL(λ) represents the normalized luminance spectrum at each wavelength. $CF_{Blue}(\lambda)$ represents the transmittance of light at each wavelength passing through the blue filter 122B of the color filter substrate 122. $CF_{Green}(\lambda)$ represents the transmittance of light at each wavelength passing through the green filter 122G of the color filter substrate 122. $CF_{Red}(\lambda)$ represents the transmittance of light at each wavelength passing through the red filter 122R of the color filter substrate 122. Δλ represents the wavelength interval. Moreover, to simplify calculation, the parameter for Δλ is usually 1 though it can be 5 or any other number.

In the formula (1), within the range of marginal wavelength at which red is less saturated (eg. 555-605 nm), the sum of the multiplication of the normalized luminance at each wavelength of the backlight module 110 BL(λ) and the transmittance $CF_{Red}(λ)$ of the red filter 122R is smaller than a designated value. In other words, to satisfy the formula (1), the red filter 122R of the liquid crystal display 100 can filter out the emitted light having the marginal wavelength of the less saturated red to improve the color saturation. Conceivably, to satisfy the formula (2), the green filter 122G of the liquid crystal display 100 can filter out the emitted light having the marginal wavelength of the less saturated green to improve the color saturation. Similarly, to satisfy the formula (3), the blue filter 122B of the liquid crystal display 100 can filter out the emitted light having the marginal wavelength of the less saturated blue to improve the color saturation. Hence, when the color filter substrate 122 and the backlight module 110 satisfy the formulas (1), (2), and (3), the color saturation of red light R, green light G and blue light B emitted through the liquid crystal display may reach a desired level. As a result, the color saturation of the liquid crystal display 100 can achieve an NTSC ratio of greater than 72%.

In the present embodiment, the combination of the red filter 122R and the backlight module 110 more preferably satisfies the following formula: (6)

$$1.72 \leq \sum_{555}^{605} BL(\lambda) \times CF_{Red}(\lambda) \times \Delta\lambda \leq 3.84$$

In addition, the combination of the green filter 122G and the backlight module 110 more preferably satisfies the following formula:

$$1.79 \leq \sum_{580}^{630} BL(\lambda) \times CF_{Green}(\lambda) \times \Delta\lambda \leq 3.31 \quad (7)$$

Furthermore, the combination of the blue filter 122B and the backlight module 110 more preferably satisfies the following formula:

$$0.65 \leq \sum_{505}^{580} BL(\lambda) \times CF_{Blue}(\lambda) \times \Delta\lambda \leq 2.39 \quad (8)$$

In the present embodiment, the combination of the color filter substrate 122 and the backlight module 110 further satisfies the following formulas to enable the transmittance of the display 100 to reach a desired level:

$$\sum_{605}^{680} BL(\lambda) \times CF_{Red}(\lambda) \times \Delta\lambda \geq 11.0; \quad (4)$$

$$\sum_{500}^{560} BL(\lambda) \times CF_{Green}(\lambda) \times \Delta\lambda \geq 12.6 \quad (5)$$

In the formula (4), within the range of the dominant wavelength for red light (eg. 605~680 nm), the sum of the multiplication of the normalized luminance at each wavelength of the backlight module 110 BL(λ) and the transmittance $CF_{Red}(λ)$ of the red filter 122R is greater than a designated value. In other words, to satisfy the formula (4), the red filter 122R of the liquid crystal display 100 allows a higher transmittance for the dominant wavelength of red light. Conceivably, to satisfy the formula (5), the green filter 122G of the liquid crystal display 100 allows a higher transmittance for the dominant wavelength of green light. In practice, when the combination of the color filter substrate 122 and the backlight module 110 satisfies the formulas (1), (2), (3), (4), and (5), the resulted color saturation reaches an NTSC ratio of 72% and above. Moreover, the transmittance of the color filter 122 may be determined to be greater than the standard value of 27.0 based on the International Commission on Illumination (CIE) standard reference for standard light source (light source C).

Moreover, the opposite substrate in the liquid crystal display 100 of the present embodiment is a thin film transistor array substrate. In the other embodiment of the present invention, the color filter substrate is a color filter on array (COA) substrate and the opposite substrate is a substrate having a common electrode. In another embodiment of the present invention, the color filter substrate is an array on color filter (AOC) substrate and the opposite substrate is a substrate having a common electrode.

The liquid crystal display 100 in the present embodiment uses a white point source comprising a blue light emitting element, yttrium aluminum garnet (YAG) phosphor and a red light emitting element. In the other embodiment, a white point source comprising a blue light emitting element, YAG phosphor and a red light phosphor may be used. However, the present invention is not limited to the type of white point source.

In the present embodiment, the blue light emitting element and the red light emitting element comprise light emitting diode chips. In the other embodiment, the blue light emitting element and the red light emitting element may be organic light emitting diode chips or other types of chips.

In the present embodiment, the backlight module 110 is a direct type backlight module. In the other embodiment, the backlight module can be an edge type backlight module. However, the present invention is not limited to the type of the backlight module.

Several embodiments that illustrate various combinations of the color filter substrate 122 and the backlight module 110 are described as follows.

First Embodiment

Figure 2A:
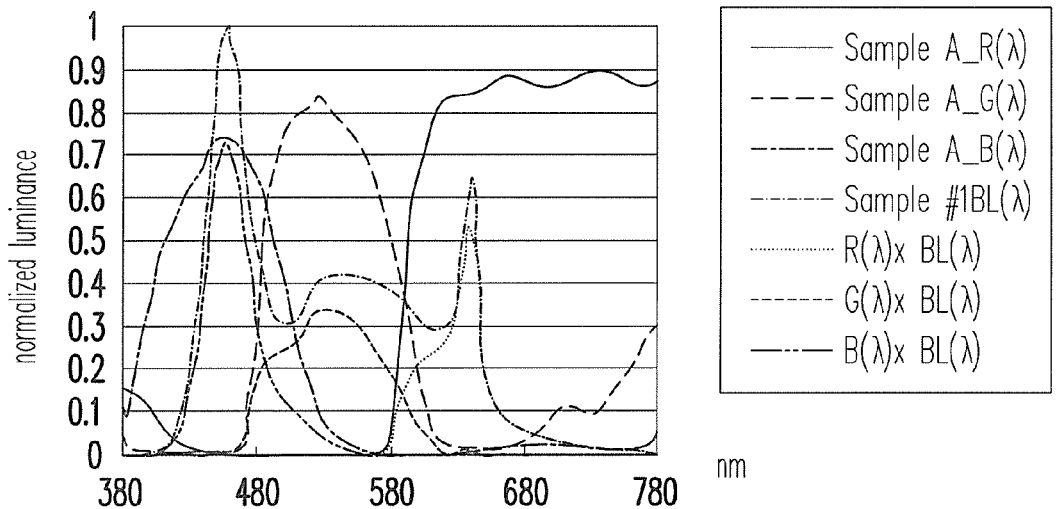
FIG. 2A is a spectrum of light emitted by the white point source according to the first embodiment of the present invention.

The present embodiment uses a color filter substrate designated as Sample A in combination with a backlight module designated as Sample #1. FIG. 2A is a spectrum of light emitted by the white point source used in the first embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 3.84, \quad (1A)$$

$$\sum_{580}^{630} BL(\lambda) \times CF_{Green}(\lambda) \times \Delta\lambda = 3.31, \quad (2A)$$

$$\sum_{505}^{580} BL(\lambda) \times CF_{Blue}(\lambda) \times \Delta\lambda = 2.35, \quad (3A)$$

-continued $$\sum_{605}^{680} BL(\lambda) \times CF_{Red}(\lambda) \times \Delta\lambda = 17.13, \quad (4A)$$

and $$\sum_{500}^{560} BL(\lambda) \times CF_{Green}(\lambda) \times \Delta\lambda = 18.61. \quad (5A)$$

Figure 2B:
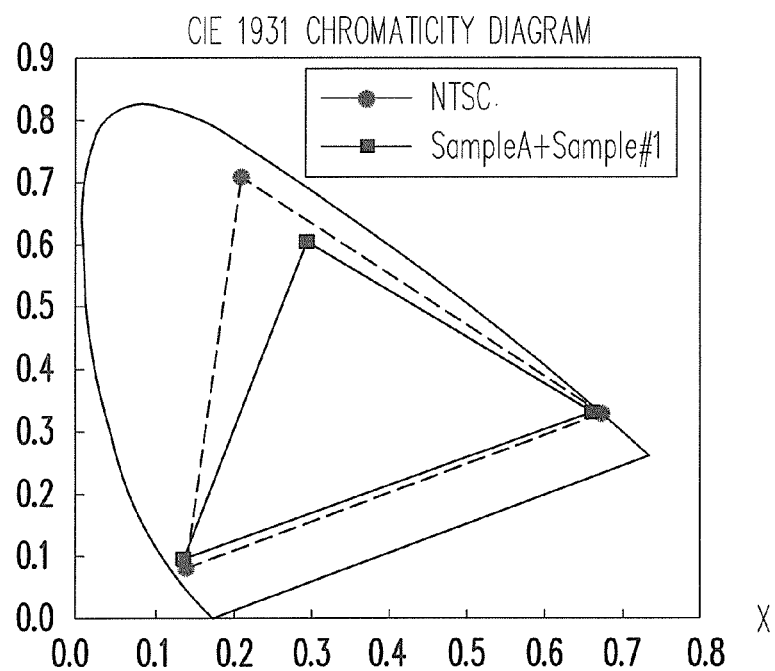
FIG. 2B is a CIE 1931 chromaticity diagram constructed based on the actual test results of the liquid crystal display according to the first embodiment of the present invention.

The five above-mentioned formulas (1A), (2A), (3A), (4A), and (5A) each respectively satisfies the five formulas (1), (2), (3, (4), and (5). Further, FIG. 2B is a CIE 1931 chromaticity diagram constructed based on the actual test results of the liquid crystal display according to the first embodiment. According to FIG. 2B, the NTSC ratio for the liquid crystal display of the present embodiment is 72.5%, which is greater than the standard NTSC ratio of 72%. Moreover, the transmittance of the color filter is determined to be 27.51, which is greater than the CIE standard value of 27.0 according to the International Commission on Illumination (CIE) standard reference for standard light source (light source C).

Generally, substituting the results for a conventional combination of the backlight module and the color filter used in the liquid crystal display into the formulas (1), (2), (3), (4) and (5) one gets 6.53 for (1), 3.76 for (2) 3.55 for (3), 8.17 for (4), and 11.18 for (5). Further, the conventional liquid crystal displays demonstrates a NTSC ratio of 44.4% on the CIE 1931 chromaticity diagram. Thus, the color saturation produced by the liquid crystal display according to the present embodiment is better than that produced by the conventional liquid crystal display.

Second Embodiment

Figure 3A:
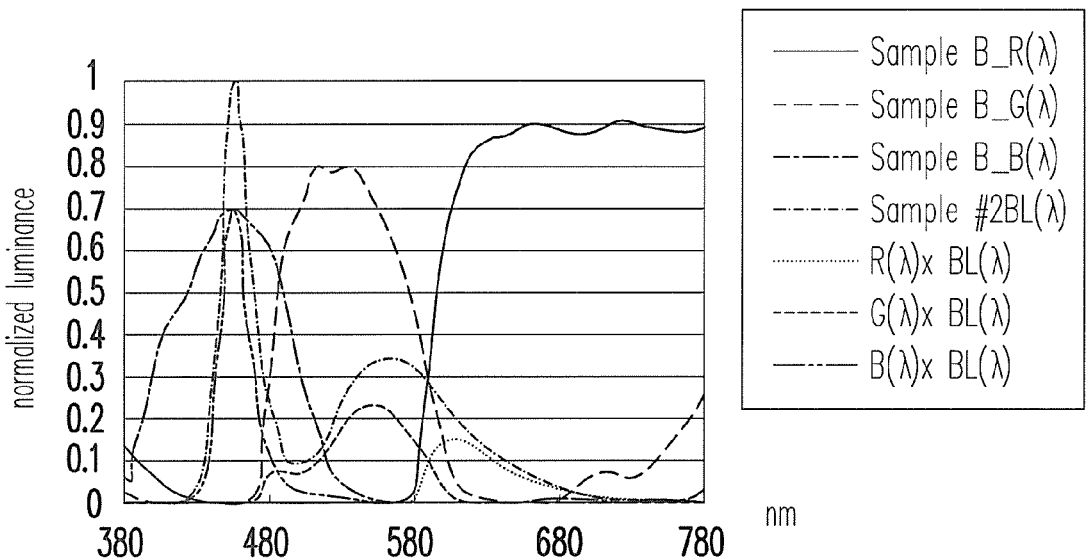
FIG. 3A is a spectrum of light emitted by the white point source according to the second embodiment of the present invention.

The present embodiment uses a color filter substrate designated as Sample B in combination with a backlight module designated as Sample #2. FIG. 3A is a spectrum of light emitted by the white point source used in the second embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 2.58, \quad (1B)$$

$$\sum_{580}^{630} BL(\lambda) \times CF_{Green}(\lambda) \times \Delta\lambda = 2.05, \quad (2B)$$

$$\sum_{505}^{580} BL(\lambda) \times CF_{Blue}(\lambda) \times \Delta\lambda = 0.65, \quad (3B)$$

$$\sum_{605}^{680} BL(\lambda) \times CF_{Red}(\lambda) \times \Delta\lambda = 6.86, \quad (4B)$$

and $$\sum_{500}^{560} BL(\lambda) \times CF_{Green}(\lambda) \times \Delta\lambda = 10.32. \quad (5B)$$

Figure 3B:
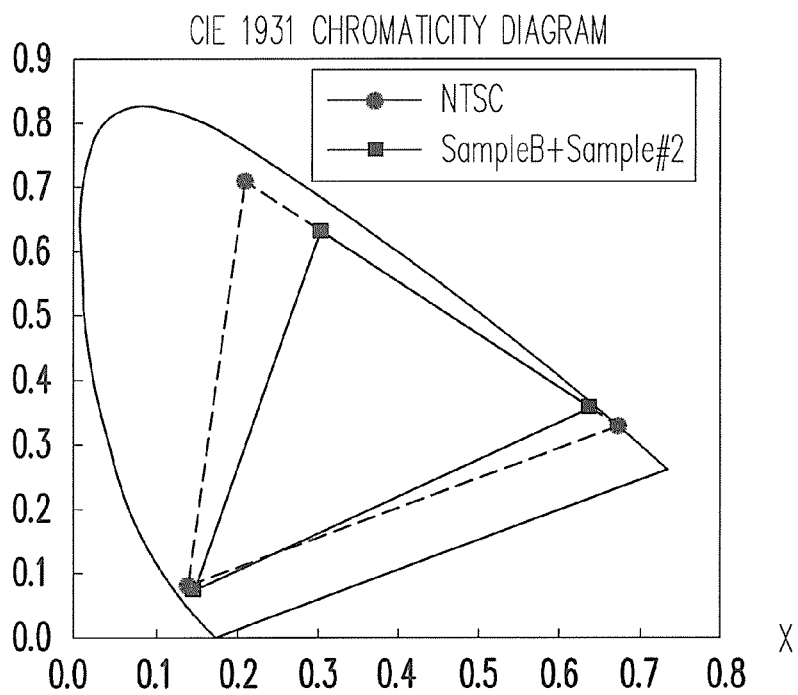
FIG. 3B is a CIE 1931 chromaticity diagram constructed based on the actual test results of the liquid crystal display according to the second embodiment of the present invention.

The three above-mentioned formulas (1B), (2B), and (3B) each respectively satisfies the three formulas (1), (2), and (3). Further, FIG. 3B is a CIE 1931 chromaticity diagram constructed based on the actual test results of the liquid crystal display according to the second embodiment. According to FIG. 3B, the NTSC ratio for the liquid crystal display of the present embodiment is 72.3%, which is greater than the standard NTSC ratio of 72%. The transmittance of the color filter substrate of the present embodiment is determined to be 25.23

Third Embodiment

Figure 4A:
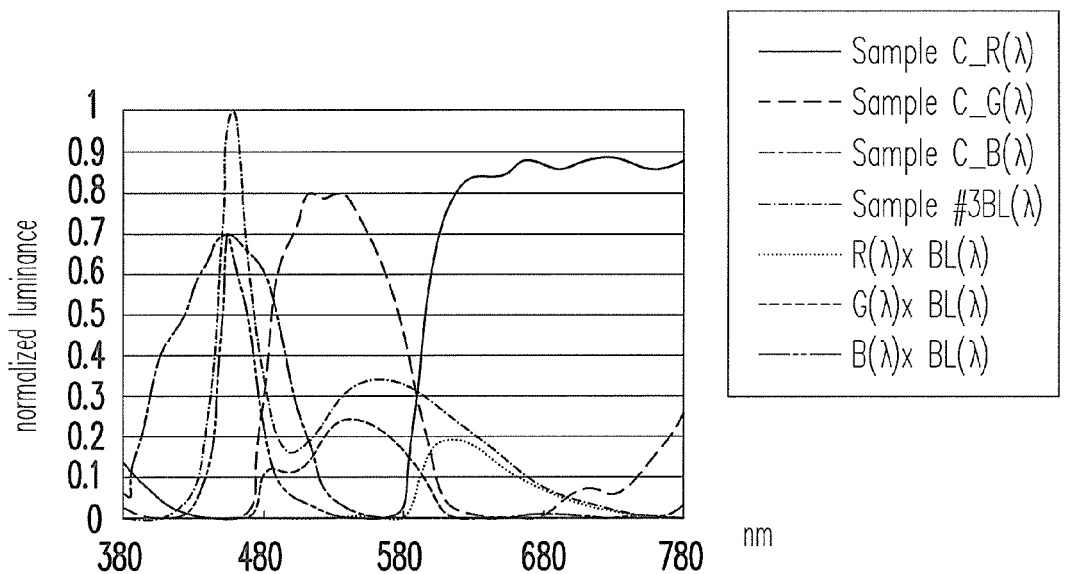
FIG. 4A is a spectrum of light emitted by the white point source according to the third embodiment of the present invention.

The present embodiment uses a color filter substrate designated as Sample C in combination with a backlight module designated as Sample #3. FIG. 4A is a spectrum of light emitted by the white point source used in the third embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 3.15, \quad (1C)$$

$$\sum_{580}^{630} BL(\lambda) \times CF_{Green}(\lambda) \times \Delta\lambda = 2.46, \quad (2C)$$

$$\sum_{505}^{580} BL(\lambda) \times CF_{Blue}(\lambda) \times \Delta\lambda = 1.09, \quad (3C)$$

$$\sum_{605}^{680} BL(\lambda) \times CF_{Red}(\lambda) \times \Delta\lambda = 10.69, \quad (4C)$$

$$\sum_{500}^{560} BL(\lambda) \times CF_{Green}(\lambda) \times \Delta\lambda = 12.54, \quad (5C)$$

Figure 4B:
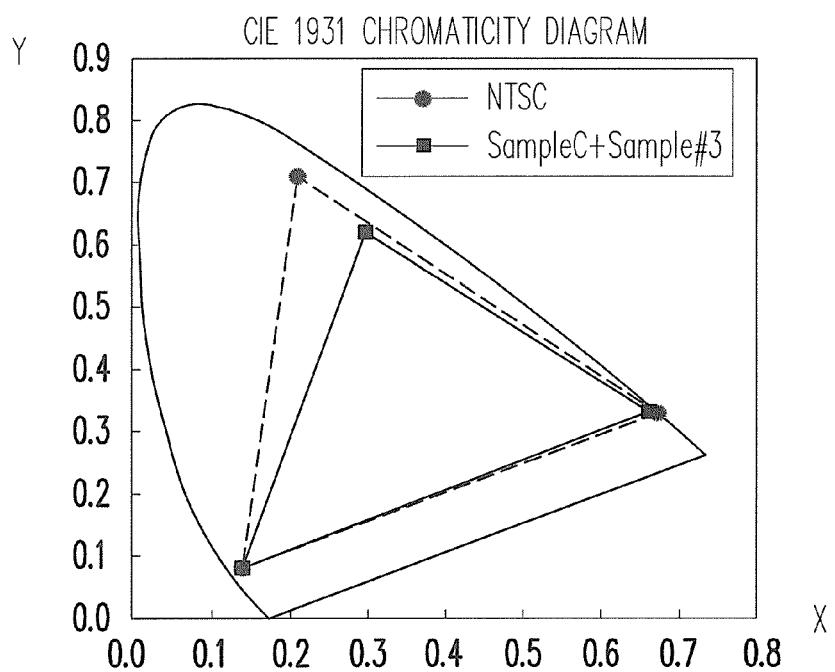
FIG. 4B is a CIE 1931 chromaticity diagram constructed based on the actual test results of the liquid crystal display according to the third embodiment of the present invention.

The three above-mentioned formulas (1C), (2C), and (3C) each respectively satisfies the three formulas (1), (2), and (3). Further, FIG. 4B is a CIE 1931 chromaticity diagram constructed based on the actual test results of the liquid crystal display according to the third embodiment. According to FIG. 4B, the NTSC ratio for the liquid crystal display of the present embodiment is 72.6%, which is greater than the standard NTSC ratio of 72%. The transmittance of the color filter substrate of the present embodiment is determined to be 25.86.

Fourth Embodiment

Figure 5A:
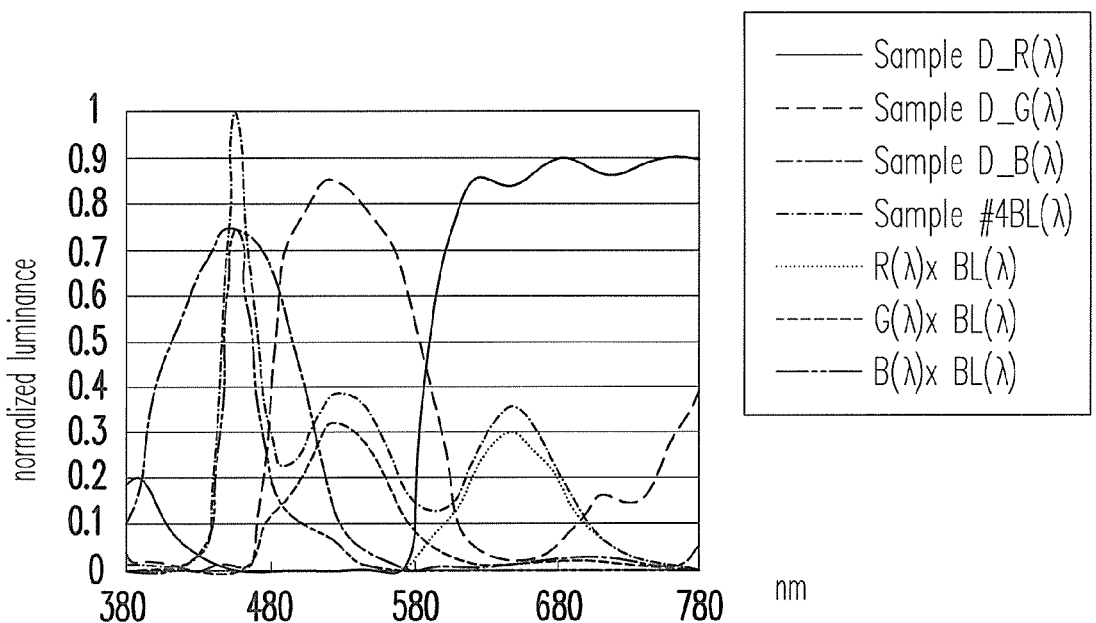
FIG. 5A is a spectrum of light emitted by the white point source according to the fourth embodiment of the present invention.

The present embodiment uses a color filter substrate designated as Sample D in combination with a backlight module designated as Sample #4. FIG. 5A is a spectrum of light emitted by the white point source used in the fourth embodiment of the present invention. Herein, R(λ), G(λ), and B(λ) respectively represent the peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 1.72, \quad (1D)$$

$$\sum_{580}^{630} BL(\lambda) \times CF_{Green}(\lambda) \times \Delta\lambda = 1.79, \quad (2D)$$

$$\sum_{505}^{580} BL(\lambda) \times CF_{Blue}(\lambda) \times \Delta\lambda = 2.39, \quad (3D)$$

$$\sum_{605}^{680} BL(\lambda) \times CF_{Red}(\lambda) \times \Delta\lambda = 17.90, \quad (4D)$$

and $$\sum_{500}^{560} BL(\lambda) \times CF_{Green}(\lambda) \times \Delta\lambda = 16.76. \quad (5D)$$

Figure 5B:
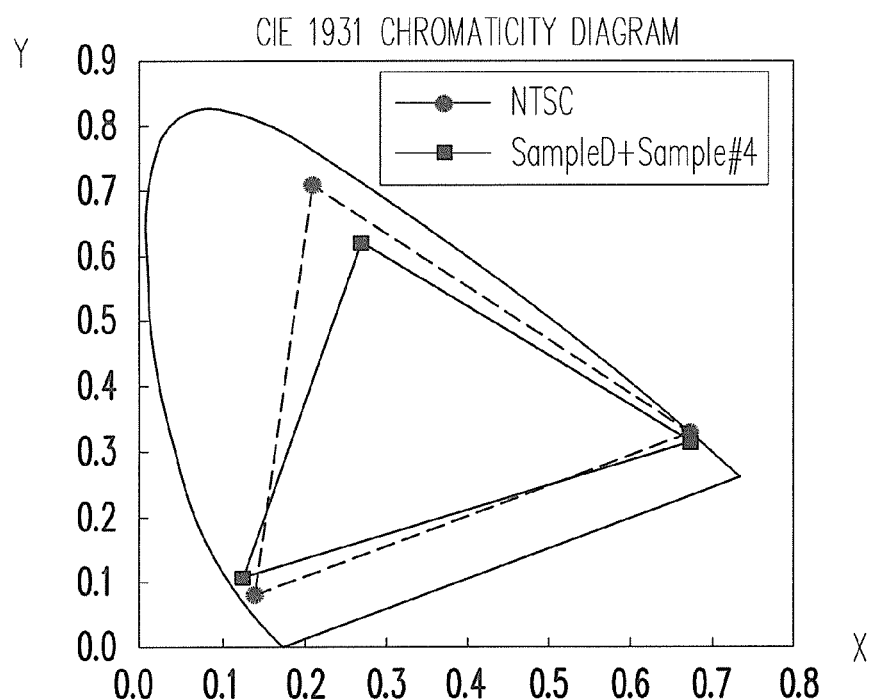
FIG. 5B is a CIE 1931 chromaticity diagram constructed based on the actual test results of the liquid crystal display according to the fourth embodiment of the present invention.

The above-mentioned five formulas (1D), (2D), (3D), (4D), and (5D) each respectively satisfies the five formulas (1), (2), (3), (4), and (5). Further, FIG. 5B is a CIE 1931 chromaticity diagram constructed based on the actual test results of the liquid crystal display according to the fourth embodiment. According to FIG. 5B, the NTSC ratio for the liquid crystal display of the present embodiment is 78.7%, which is greater than the standard NTSC ratio of 72%. Additionally, the transmittance of the color filter substrate of the present embodiment is determined to be 29.22, which is greater than the standard transmittance of 27.0 based on the International Commission on Illumination (CIE) standard reference for standard light source (light source C).

Fifth Embodiment

Figure 6A:
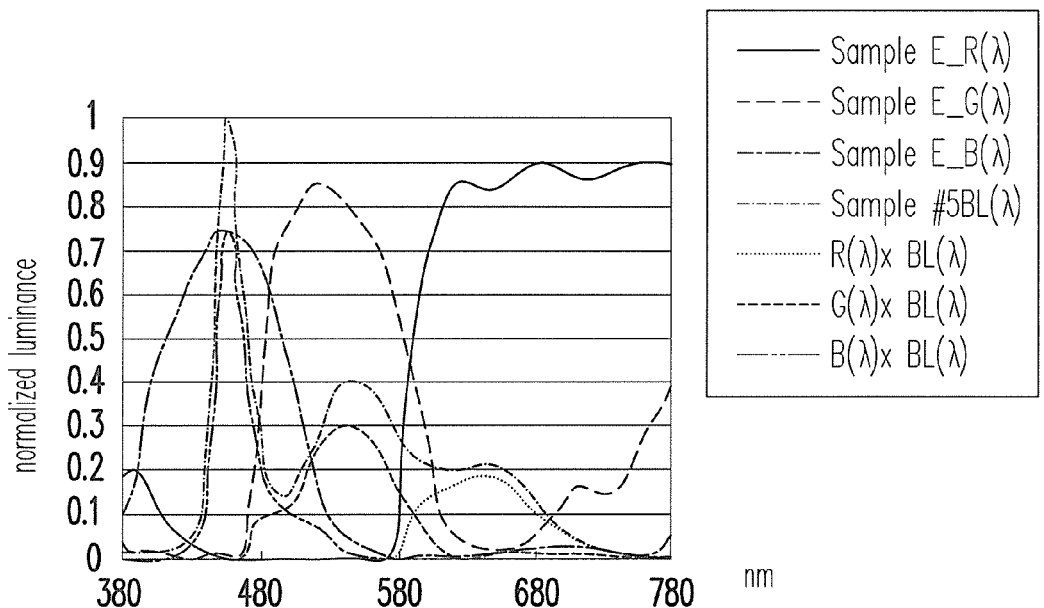
FIG. 6A is a spectrum of light emitted by the white point source according to the fifth embodiment of the present invention.

The present embodiment uses a color filter substrate designated as Sample E in combination with a backlight module designated as Sample #5. FIG. 6A is a spectrum of light emitted by the white point source used in the fifth embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 2.71, \quad (1E)$$

$$\sum_{580}^{630} BL(\lambda) \times CF_{Green}(\lambda) \times \Delta\lambda = 2.52, \quad (2E)$$

$$\sum_{505}^{580} BL(\lambda) \times CF_{Blue}(\lambda) \times \Delta\lambda = 1.89, \quad (3E)$$

$$\sum_{605}^{680} BL(\lambda) \times CF_{Red}(\lambda) \times \Delta\lambda = 12.13, \quad (4E)$$

and $$\sum_{500}^{560} BL(\lambda) \times CF_{Green}(\lambda) \times \Delta\lambda = 15.17, \quad (5E)$$

Figure 6B:
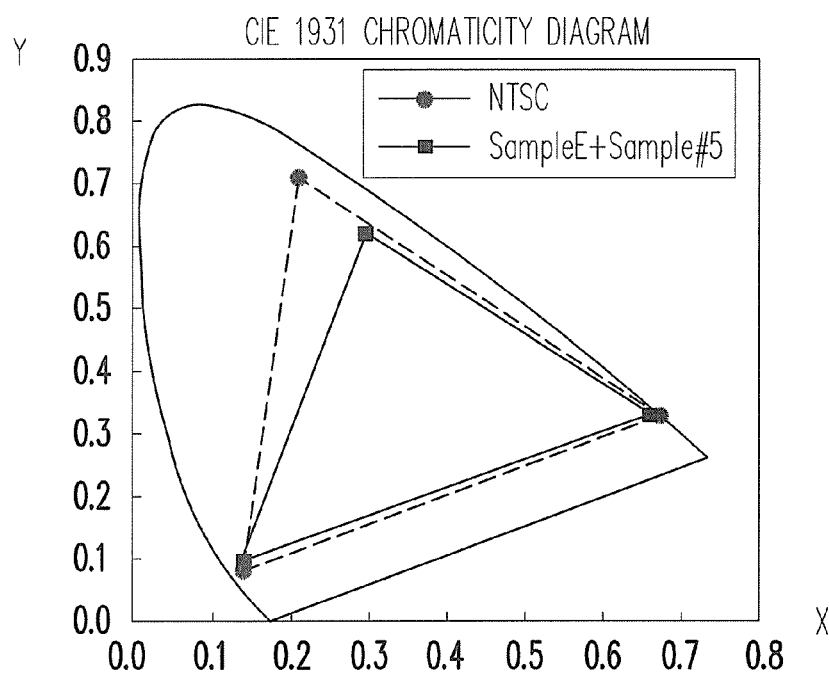
FIG. 6B is a CIE 1931 chromaticity diagram constructed based on the actual test results of the liquid crystal display according to the fifth embodiment of the present invention.

The above-mentioned five formulas (1E), (2E), (3E), (4E), and (5E) each respectively satisfies the five formulas (1), (2), (3), (4), and (5). Further, FIG. 6B is a CIE 1931 diagram constructed based on the actual test results of the liquid crystal display according to the fifth embodiment. According to FIG. 6B, the NTSC ratio for the liquid crystal display of the present embodiment is 72.5%, which is greater than the standard NTSC ratio of 72%. Additionally, the transmittance of the color filter substrate of the present embodiment is determined to be 28.20, which is greater than the standard transmittance of 27.0 based on the International Commission on Illumination (CIE) standard reference for standard light source (light source C).

Sixth Embodiment

Figure 7A:
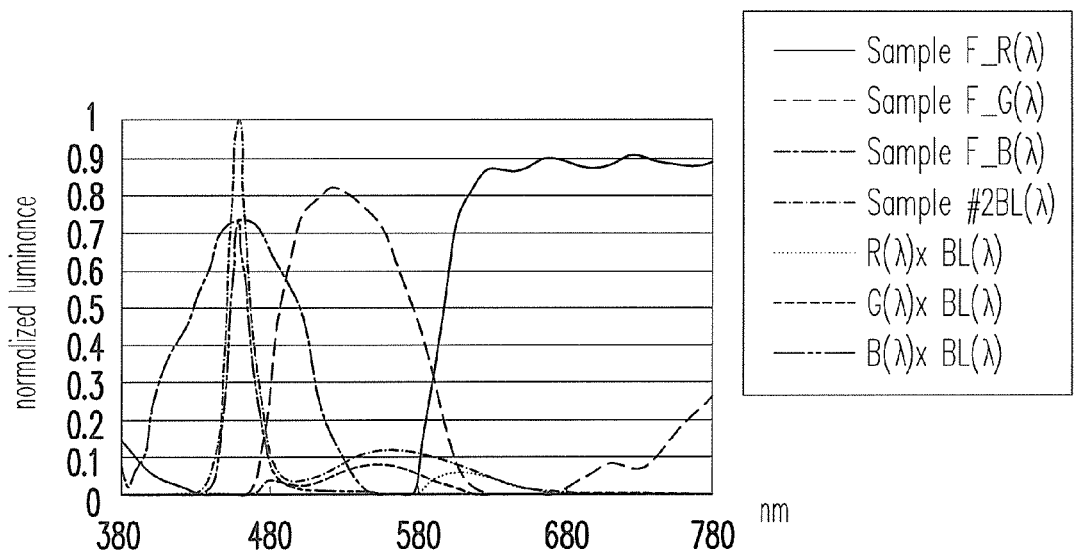
FIG. 7A is a spectrum of light emitted by the white point source according to the sixth embodiment of the present invention.

The present embodiment uses a color filter substrate designated as Sample F in combination with a backlight module designated as Sample #2. FIG. 7A is a spectrum of light emitted by the white point source used in the sixth embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 3.13, \quad (1F)$$

$$\sum_{580}^{630} BL(\lambda) \times CF_{Green}(\lambda) \times \Delta\lambda = 2.39, \quad (2F)$$

$$\sum_{505}^{580} BL(\lambda) \times CF_{Blue}(\lambda) \times \Delta\lambda = 1.36, \quad (3F)$$

$$\sum_{605}^{680} BL(\lambda) \times CF_{Red}(\lambda) \times \Delta\lambda = 10.93, \quad (4F)$$

and $$\sum_{500}^{560} BL(\lambda) \times CF_{Green}(\lambda) \times \Delta\lambda = 12.57. \quad (5F)$$

Figure 7B:
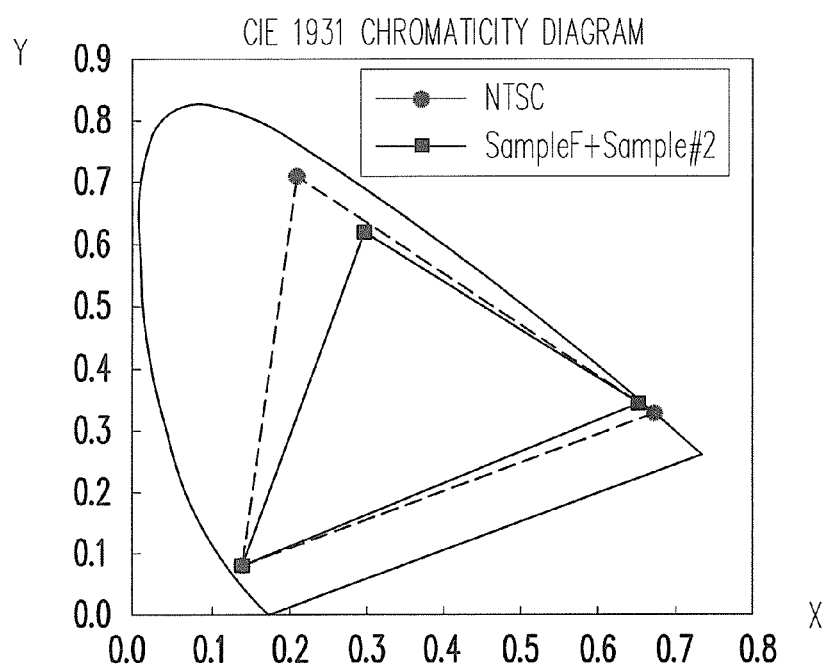
FIG. 7B is a CIE 1931 chromaticity diagram constructed based on the actual test results of the liquid crystal display according to the sixth embodiment of the present invention.

The three above-mentioned formulas (1F), (2F), and (3F) each respectively satisfies the three formulas (1, (2), and (3). Further, FIG. 7B is a CIE 1931 chromaticity diagram constructed based on the actual test results of the liquid crystal display according to the sixth embodiment. According to FIG. 7B, the NTSC ratio for the liquid crystal display of the present embodiment is 72.2%, which is greater than the standard NTSC ratio of 72%. The transmittance of the color filter substrate of the present embodiment is determined to be 26.33.

Seventh Embodiment

Figure 8A:
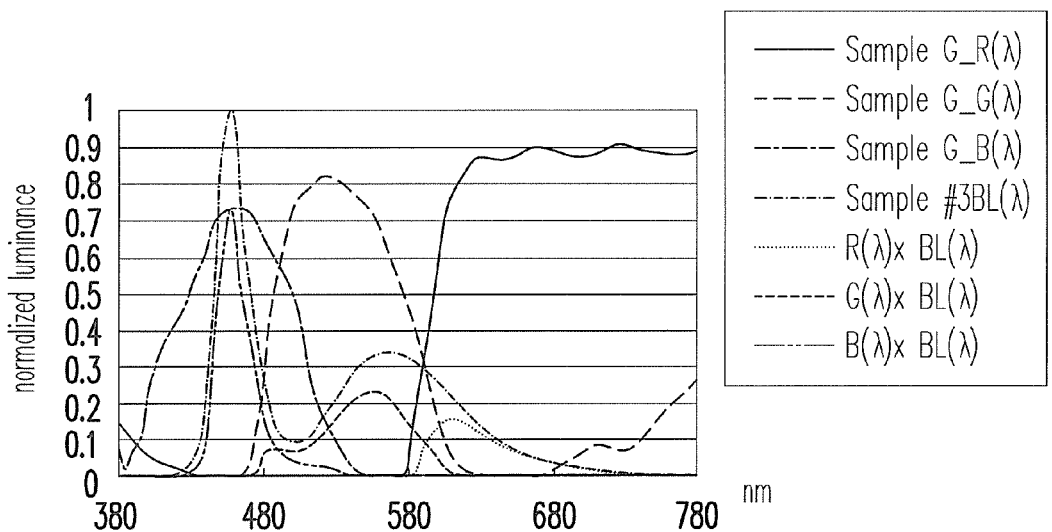
FIG. 8A is a spectrum of light emitted by the white point source according to the seventh embodiment of the present invention.

The present embodiment uses a color filter substrate designated as Sample G in combination with a backlight module designated as Sample #3. FIG. 8A is a spectrum of light emitted by the white point source used in the seventh embodiment of the present invention. Herein, R(λ), G(λ), and B(λ) respectively represent the three peaks of red light, green light and blue light emitted by the spectrum of the white point source and BL(λ) represents the normalized luminance at each wavelength. Within a specific range of wavelength, the combination of the color filter substrate and the backlight module satisfies the following formulas:

$$\sum_{555}^{605} BL(\lambda) \times CF_{Red}(\lambda) \times \Delta\lambda = 2.60, \quad (1G)$$

$$\sum_{580}^{630} BL(\lambda) \times CF_{Green}(\lambda) \times \Delta\lambda = 1.89, \quad (2G)$$

$$\sum_{505}^{580} BL(\lambda) \times CF_{Blue}(\lambda) \times \Delta\lambda = 0.87, \quad (3G)$$

$$\sum_{605}^{680} BL(\lambda) \times CF_{Red}(\lambda) \times \Delta\lambda = 7.01, \quad (4G)$$

and $$\sum_{500}^{560} BL(\lambda) \times CF_{Green}(\lambda) \times \Delta\lambda = 10.24. \quad (5G)$$

Figure 8B:
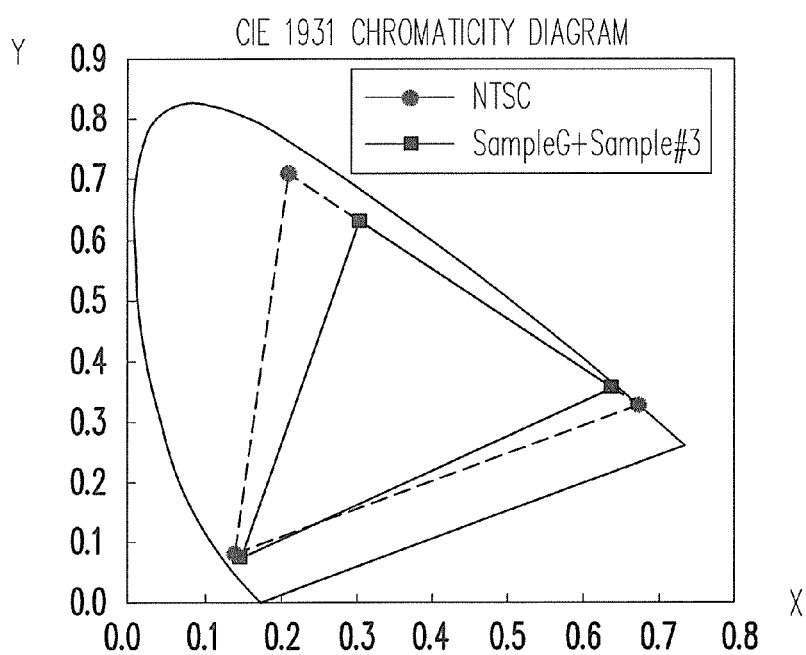
FIG. 8B is a CIE 1931 chromaticity diagram constructed based on the actual test results of the liquid crystal display according to the seventh embodiment of the present invention.

The three above-mentioned formulas (1G), (2G), and (3G) each respectively satisfies the three formulas (1), (2), and (3). Further, FIG. 8B is a CIE 1931 chromaticity diagram constructed based on the actual test results of the liquid crystal display according to the seventh embodiment. According to FIG. 8B, the NTSC ratio for the liquid crystal display of the present embodiment is 72.5%, which is greater than the standard NTSC ratio of 72%. The transmittance of the color filter substrate of the present embodiment is determined to be 25.53.

Accordingly, when the color filter and the backlight module of the liquid crystal display of the present invention satisfies the formulas (1), (2), and (3), the color saturation of the liquid crystal display can achieve an NTSC ratio of 72% and above. The appropriate backlight module and the color filter are chosen based on this criterion. Prior to the later stage of constructing the liquid crystal display, choosing the suitable combination of the backlight module and color filter enables the liquid crystal display to achieve the desired color saturation.

Although the present invention has been disclosed above by the embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A liquid crystal display (LCD), comprising:
   a backlight module comprising at least one white point source, emitting a spectrum of light comprising at least three peaks;
   a liquid crystal display panel, disposed over the backlight module and comprising a color filter substrate, an opposite substrate and a liquid crystal layer, wherein the liquid crystal layer is disposed between the color filter substrate and the opposite substrate; the color filter substrate consists of a blue filter, a green filter and a red filter; and the color filter substrate and the backlight module satisfy the following formulas:

$$\sum_{555}^{605} BL(\lambda) \times CF_{Red}(\lambda) \times \Delta\lambda \leq 6.0$$

$$\sum_{580}^{630} BL(\lambda) \times CF_{Green}(\lambda) \times \Delta\lambda \leq 3.5$$

$$\sum_{505}^{580} BL(\lambda) \times CF_{Blue}(\lambda) \times \Delta\lambda \leq 3.5$$

$$\sum_{605}^{680} BL(\lambda) \times CF_{Red}(\lambda) \times \Delta\lambda \geq 11.0$$

$$\sum_{500}^{560} BL(\lambda) \times CF_{Green}(\lambda) \times \Delta\lambda \geq 12.6$$

wherein the backlight module has the maximum luminance in one wavelength, with the maximum luminance being set at 1.0; BL(λ) represents the normalized luminance spectrum at each wavelength; $CF_{Blue}(\lambda)$ represents the transmittance of light at each wavelength passing through the blue filter; $CF_{Green}(\lambda)$ represents the transmittance of light at each wavelength passing through the green filter; $CF_{Red}(\lambda)$ represents the transmittance of light at each wavelength passing through the red filter; and Δλ represents the wavelength interval.

2. The liquid crystal display of claim 1, wherein the red filter and the backlight module further satisfy the following formula:

$$1.72 \leq \sum_{555}^{605} BL(\lambda) \times CF_{Red}(\lambda) \times \Delta\lambda \leq 3.84$$

3. The liquid crystal display of claim 1, wherein the green filter and the backlight module further satisfy the following formula:

$$1.79 \leq \sum_{580}^{630} BL(\lambda) \times CF_{Green}(\lambda) \times \Delta\lambda \leq 3.31$$

4. The liquid crystal display of claim 1, wherein the blue filter and the backlight module further satisfy the following formula:

$$0.65 \leq \sum_{505}^{580} BL(\lambda) \times CF_{Blue}(\lambda) \times \Delta\lambda \leq 2.39$$

5. The liquid crystal display of claim 1, wherein Δλ is 1.

6. The liquid crystal display of claim 1, wherein the opposite substrate is a thin film transistor array substrate.

7. The liquid crystal display of claim 1, wherein the color filter substrate is a color filter on array (COA) substrate and the opposite substrate is a substrate having a common electrode.

8. The liquid crystal display of claim 1, wherein the color filter substrate is an array on color filter (AOC) substrate and the opposite substrate is a substrate having a common electrode.

9. The liquid crystal display of claim 1, wherein the white point source comprises a blue light emitting element, yttrium aluminum garnet (YAG) phosphor and a red light emitting element.

10. The liquid crystal display of claim 9, wherein the blue light emitting element and the red light emitting element comprise light emitting diode chips or organic light emitting diode chips.

11. The liquid crystal display of claim 1, wherein the white point source comprises a blue light emitting element, YAG phosphor and a red light phosphor.

12. The liquid crystal display of claim 11, wherein the blue light emitting element comprises light emitting diode chips or organic light emitting diode chips.

13. The liquid crystal display of claim 1, wherein the backlight module comprises a direct type backlight module or an edge type backlight module.

14. A display, comprising:
a backlight module comprising at least one white point source, emitting a spectrum of light comprising at least three peaks; and
a display panel disposed over the backlight module and comprising a color filter substrate, the color filter substrate consisting of at least a blue filter, a green filter and a red filter, wherein the color filter substrate and the backlight module satisfy the following formulas:

$$\sum_{555}^{605} BL(\lambda) \times CF_{Red}(\lambda) \times \Delta\lambda \leq 6.0$$

$$\sum_{580}^{630} BL(\lambda) \times CF_{Green}(\lambda) \times \Delta\lambda \leq 3.5$$

$$\sum_{505}^{580} BL(\lambda) \times CF_{Blue}(\lambda) \times \Delta\lambda \leq 3.5$$

$$\sum_{605}^{680} BL(\lambda) \times CF_{Red}(\lambda) \times \Delta\lambda \geq 11.0$$

-continued $$\sum_{500}^{560} BL(\lambda) \times CF_{Green}(\lambda) \times \Delta\lambda \geq 12.6$$

wherein the backlight module has the maximum luminance in one wavelength, with the maximum luminance being set at 1.0; $BL(\lambda)$ represents the normalized luminance spectrum at each wavelength; $CF_{Blue}(\lambda)$ represents the transmittance of light at each wavelength passing through the blue filter; $CF_{Green}(\lambda)$ represents the transmittance of light at each wavelength passing through the green filter; $CF_{Red}(\lambda)$ represents the transmittance of light at each wavelength passing through the red filter; and $\Delta\lambda$ represents the wavelength interval.

15. The display of claim 14, wherein the red filter and the backlight module further satisfy the following formula:

$$1.72 \leq \sum_{555}^{605} BL(\lambda) \times CF_{Red}(\lambda) \times \Delta\lambda \leq 3.84$$

16. The display of claim 14, wherein the green filter and the backlight module further satisfy the following formula:

$$1.79 \leq \sum_{580}^{630} BL(\lambda) \times CF_{Green}(\lambda) \times \Delta\lambda \leq 3.31$$

17. The display of claim 14, wherein the blue filter and the backlight module further satisfy the following formula:

$$0.65 \leq \sum_{505}^{580} BL(\lambda) \times CF_{Blue}(\lambda) \times \Delta\lambda \leq 2.39$$

18. The display of claim 14, wherein $\Delta\lambda$ is 1.

19. The display of claim 14, wherein the white point source comprises a blue light emitting element, yttrium aluminum garnet (YAG) phosphor and a red light emitting element.

20. The display of claim 14, wherein the white point source comprises a blue light emitting element, YAG phosphor and a red light phosphor.

* * * * *